C. CHINNOCK.

Axle-Box.

No. 6,004.

2 Sheets—Sheet 1.

Patented Jan. 9, 1849.

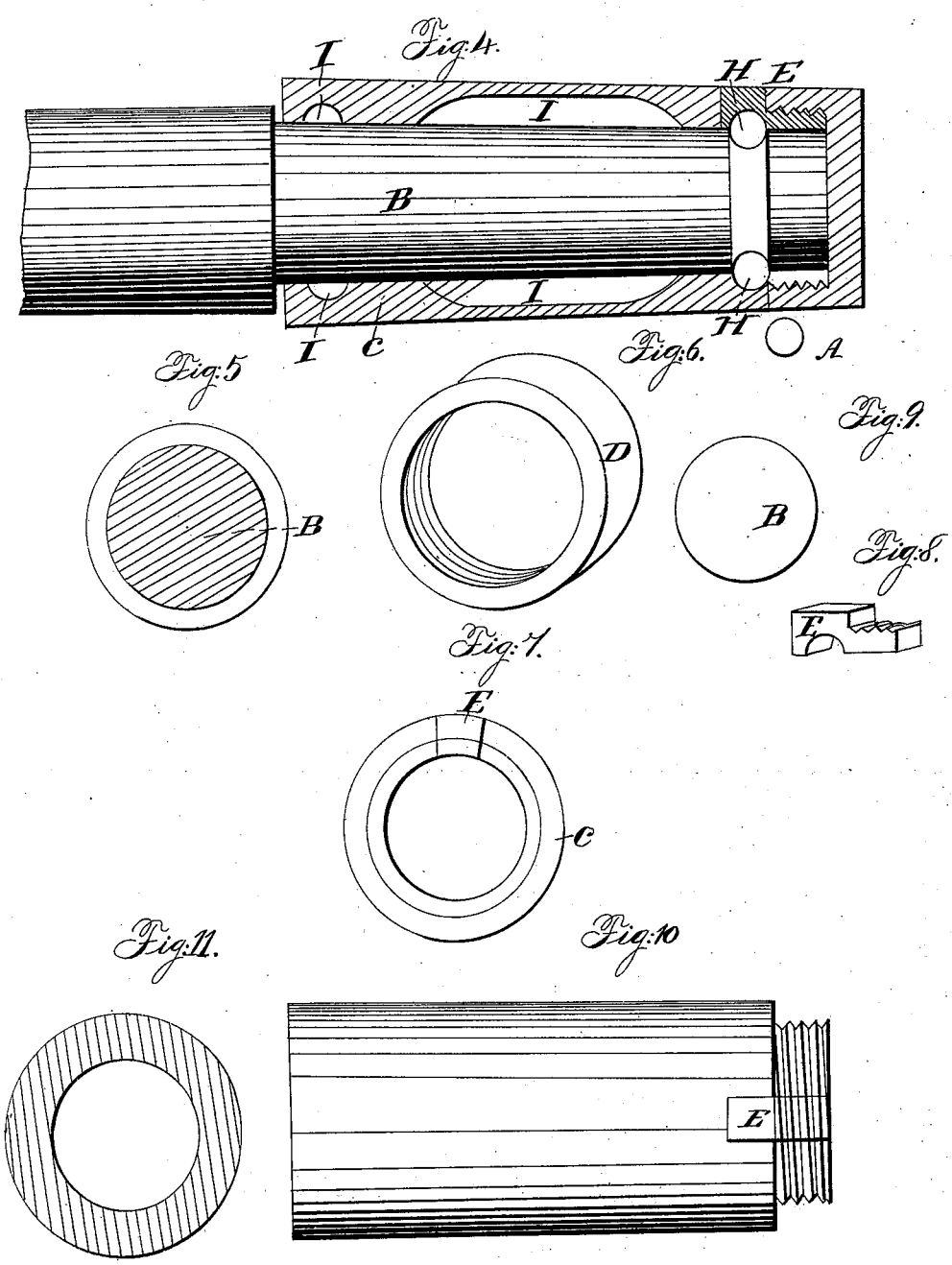

UNITED STATES PATENT OFFICE.

CHARLES CHINNOCK, OF NEW YORK, N. Y.

CONNECTING HUBS AND AXLES.

Specification of Letters Patent No. 6,004, dated January 9, 1849.

*To all whom it may concern:*

Be it known that I, CHARLES CHINNOCK, of the city, county, and State of New York, have invented a new and useful Improvement in Journals and Axles; and I hereby declare that the following is a full and exact description.

To enable others to make and use my invention I proceed to describe its construction and operation reference being had to the drawings here unto annexed and making part of this specification.

Figure 1:
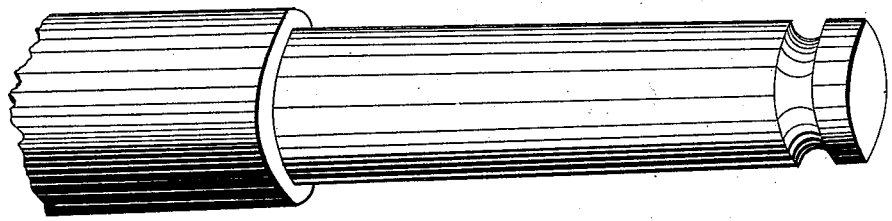
Figure 2:
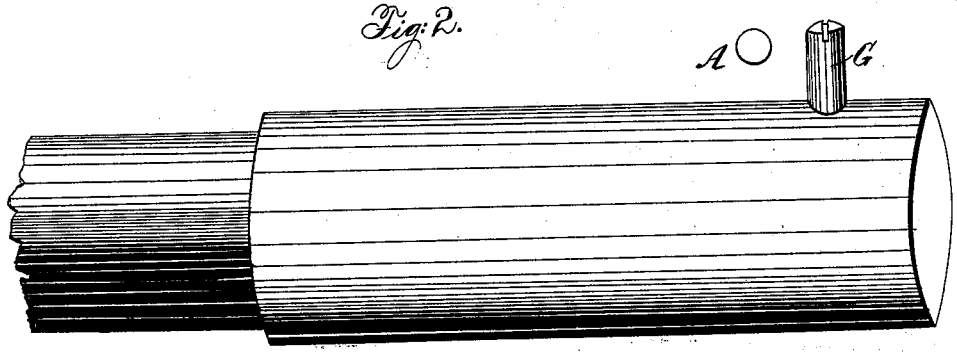
Figure 3:
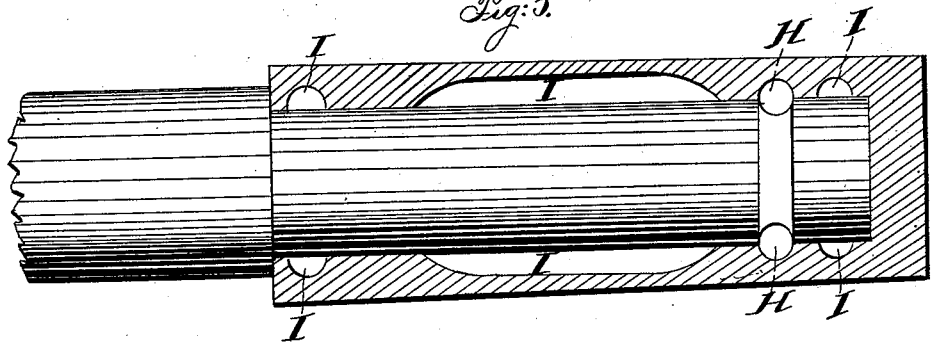

Figure 1 represents the arm of the axle. Fig. 2 shows the box—when made entire—with the axle in it; Fig. 3 longitudinal section of the box with axle in it. Fig. 4 longitudinal section of the box—when made to be closed at the outer end by a cap screw; Fig. 5 cross section of axle; Fig. 6 the cap; Fig. 7 outer end of the box; Fig. 8 the stopper or closing piece; Fig. 9 end of the axle; Fig. 10 the box without the cap; Fig. 11 cross section.

A represents the steel ball used to confine the arm of the axle in the box. G, the pin that screws into the box, Fig. 2, to fill the hole in which the ball is dropped to confine the axle in the box. The axle or journal—which is made to fit the box (which is also turned out) has a groove turned out of it near the end, generally a half circle.

The box, when made entire as shown in Figs. 2 and 3, has a place at each end inside turned out for bearings, and the rest left larger to form cavities for containing oil. There is also a semi-circular groove turned out to correspond with the groove turned out of the arm of the axle (or the substance of the journal) and in this space, H, is put the steel ball which confines it in place.

In the other plan, Fig. 4, the end of the box has a screw cut upon it, see Fig. 10, on which fits the cap D. The stopper or closing piece Fig. 8, E, is taken out and the ball put in and the cap being screwed on, the whole is secure. The box is sometimes made larger around the middle, to admit of the spaces, I, for oil, being made more capacious.

What I claim as my invention, and desire to secure by Letters Patent, is—

The confining an axle or journal within a box by means of a spherical ball or balls, running in a channel made partly in the journal and partly in the box.

CHARLES CHINNOCK.

Witnesses:
OWEN G. WARREN,
I. DWIGHT STICKNEY.